No. 898,341. PATENTED SEPT. 8, 1908.
E. R. DRAKE.
PLANT PROTECTOR.
APPLICATION FILED MAY 4, 1908.
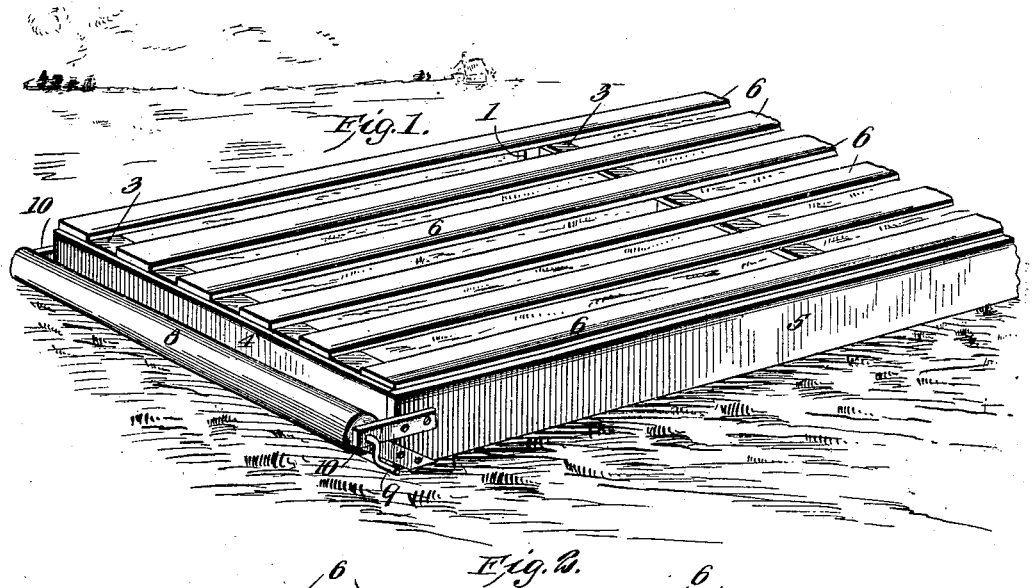
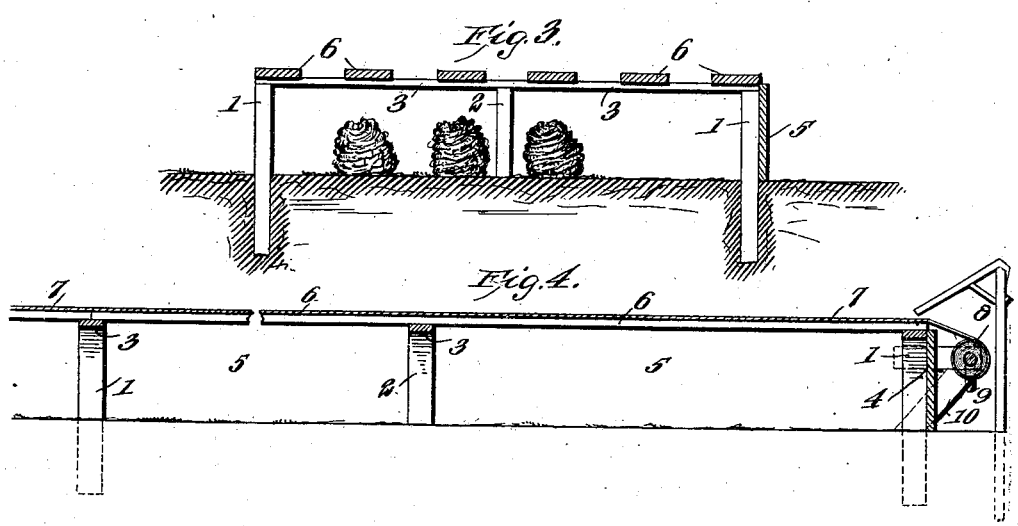
WITNESSES
INVENTOR
Edwin R. Drake
ATTORNEYS

UNITED STATES PATENT OFFICE.

EDWIN R. DRAKE, OF DE LAND, FLORIDA.

PLANT-PROTECTOR.

No. 898,341.   Specification of Letters Patent.   Patented Sept. 8, 1908.

Application filed May 4, 1908. Serial No. 430,703.

*To all whom it may concern:*

Be it known that I, EDWIN R. DRAKE, a citizen of the United States, and a resident of De Land, in the county of Volusia and State of Florida, have made certain new and useful Improvements in Plant - Protectors, of which the following is a specification.

My invention is an improved means for protecting plants, especially such as lettuce, when growing, from the injurious effect of a too hot sun and also from frost. The construction of the same is as hereinafter described, and illustrated in the accompanying drawing, in which—

Figure 1 is a perspective view of the main portion of the apparatus. Fig. 2 is an end view of the same. Fig. 3 is a transverse section. Fig. 4 is a longitudinal section.

The form of the apparatus is preferably rectangular and oblong. There are posts 1 at the corners and along the sides, and a post 2 at the center. The posts 1 are set in the ground while the post 2 rests upon the ground. Cross slats, or bars, 3, are attached to the tops of the posts and extend transversely as indicated in Figs. 1 and 3.

Protecting side boards 4 and 5 are applied to one end and one side of the frame, the same being nailed to the posts 1. These boards have a width equal to the height of the posts 1 above the ground and including the thickness of the slats or cross pieces 3. They are applied on the two sides of the apparatus which are ordinarily most exposed to the cold winds. Therefore, in the northern latitudes they would ordinarily be applied on the north and west sides of the apparatus. A series of boards 6 are laid upon the slats, or cross pieces, 3 and spaced from each other the same distance as separates the growing plants. Thus, each board extends longitudinally of the frame or apparatus and covers a row of lettuce or other plants when required to protect them from a too hot sun. These boards are ordinarily not used at the beginning of the cultivation of the plants, but when they begin to head. Their effect is to bleach the lettuce or prevent it burning by a too hot sun. When there is danger of frost, I provide a supplemental covering consisting of burlap 7, which may be stretched, as shown in Fig. 4, the entire length of the frame over the covering boards 6, and is attached to, and adapted to be wound upon, a roller 8 provided with a crank 9, journaled in brackets 10 arranged at the north end of the frame. In order to hold down the side and free-end edges of the burlap so as to prevent the wind from blowing it off, loose boards may be laid over it. When the burlap covering is no longer desired, it may be readily wound on the roller 8 by rotating it.

It will be seen that, by the construction and combination of parts hereinbefore described, I provide a cheap and simple apparatus which will effectually protect lettuce and other tender plants or vegetables both from cold winds and freezing temperature, and also from a too hot sun, so that their growth is promoted while they are rendered more tender, palatable, and digestible.

It is to be understood that all the parts of the frame will be constructed of wood.

In practice a suitable shed or roof is provided for the roller and burlap wound thereon, to protect the same from rain and the sun (see Fig. 3).

What I claim is—

1. The improved plant-protector comprising a series of corner posts and transverse slats secured thereto, boards adapted to be supported on the slats and extended at right angles to the same, a roller journaled at one end of the frame, and a flexible covering wound on the roller and adapted to be extended over the frame, as described.

2. The improved plant-protector comprising a series of corner posts, cross slats attached to and supported thereon, protecting boards attached to the posts on the two most exposed sides of the apparatus, and a protective flexible covering and a roller for winding the same, said covering being adapted, when drawn off the roller, to be extended over the frame, and thus, coacting with the side boards, preventing access of cold air to the plants.

3. The improved plant-protector comprising a series of corner posts set in the ground, a central post resting on the ground, a series of cross slats attached to and supported on the posts, a series of boards adapted to be laid crosswise of the slats, and of such width that taken collectively they are of less width than the length of the slats so that they are adapted to be spaced apart, a roller journaled at one end of the frame, and a covering of burlap attached thereto and adapted, when drawn out, to be extended over the boards, as described.

EDWIN R. DRAKE.

Witnesses:
 ISAAC A. STEWART,
 JOHN R. WETHERELL.